Nov. 8, 1932.     A. ALTIERI     1,887,004
PROPELLER FOR AIRCRAFT
Filed Sept. 1, 1931
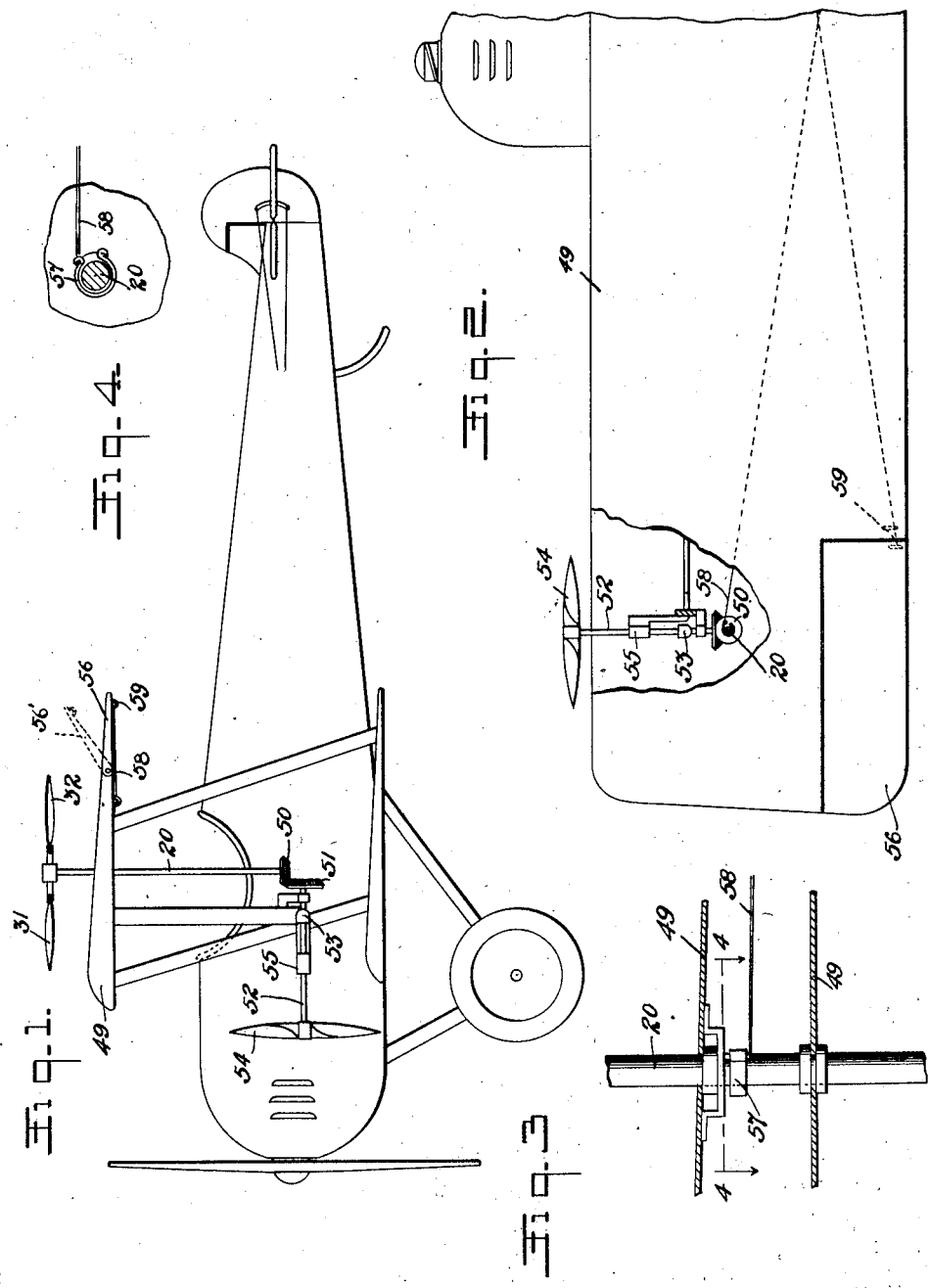
WITNESS:
INVENTOR
Alexander Altieri
BY
HIS ATTORNEY Patented Nov. 8, 1932

1,887,004

UNITED STATES PATENT OFFICE

ALEXANDER ALTIERI, OF PHILADELPHIA, PENNSYLVANIA

PROPELLER FOR AIRCRAFT

Application filed September 1, 1931. Serial No. 560,539.

This invention relates to airplanes, and has for an object to provide an auxiliary propeller adapted to perform various functions in regard to the proper positioning of the plane, relative to altitude.

A further object of the invention is to provide an improved type of adjustable propeller.

A further object of the invention is to provide an adjustable propeller for an airplane, or the like, having improved means for taking advantage of the air slip for actuating a lifting propeller.

A further object of the invention is to provide an auxiliary propeller adapted to exert a lifting force with improved means dependent upon the position of the ailerons for the actuation of such lifting propeller.

The invention, therefore, comprises a propeller mounted upon a normally vertical shaft having fins which are adjustable as to pitch, and under the control of the pilot, with a propeller mounted upon a normally horizontal shaft taking advantage of the air slip for driving the first mentioned propeller, and further means for deterring or stopping one of the propellers dependent upon the position of the ailerons and the intent of the pilot to make a bank.

In the drawing:

Figure 1 is a view in side elevation of a conventional type of airplane with the invention applied thereto, Figure 2 is a top plan view of a fragment of a conventional airplane with the invention applied thereto and broken away, Figure 3 is a detailed sectional view showing the manner of braking one of the propellers, Figure 4 is a detailed sectional view taken on line 4—4 of Figure 3.

Like characters of reference indicate corresponding parts throughout the several views.

The invention comprises a vertically journaled or lifting propeller driven from a wind wheel, receiving power from the air slip as the airplane progresses.

As thus mounted, the shaft 20 is vertically mounted through a wing 49 and is provided with a gear 50, which intermeshes with a gear 51 carried upon a shaft 52. The shaft 52 is provided with a universal joint 53, and with an auxiliary propeller 54.

This construction is in accordance with applicant's co-pending application Serial No. 531,020, filed April 18, 1931, applicant's co-pending application Serial No. 559,159, filed Aug. 25, 1931, entitled "Safety device for airplanes"; also with application Serial No. 460,138, filed June 10, 1930, in which applicant is a joint inventor.

The auxiliary propeller may obviously be independently driven, or rely wholly upon the air slip for driving, as that is immaterial to the present invention. Also, the bearing sleeve 55 is shown in accordance with applicant's said co-pending application, but is not intended as any limitation upon the present invention.

At the time of making a bank, one of the ailerons 56 will, of course, be elevated to or toward the position 56' at Figure 1. The end of the wing to which this elevated aileron is attached is the end which will be uppermost in making the bank; and it is desirable that the present invention shall assist in such lift.

For this purpose, the opposite propeller is so arranged as to be stopped or retarded in its movement. This is brought about by providing the shaft 20, in each instance, with some form of retarding or braking device.

As shown at Figure 3, a retarding device in the form of a band brake 57 is employed, embracing the shaft 20. Of course, any other type of retarding or braking device may be substituted. This, or any other type of braking or retarding device is operated by a cable 58 which extends across, preferably, within the structure of the wing 49, and is connected at the opposite side, as indicated at 59, with the aileron 56.

When the aileron, therefore, is raised to dotted line position 56', as shown at Figure 1, the cable 58 is placed under stress, which closes the band brake 57 about the shaft 20 and retards or stops said shaft from rotation and therewith the lifting propeller carried thereby. This, of course, permits the propeller upon the opposite side to assist in the lifting of that end of the wing, so that the auxiliary propeller operates in conjunction with the aileron for tilting the craft.

While it is found desirable to employ for this lifting propeller the adjustable type, as shown and described herein, it is obvious that other types of propeller may be substituted with efficiency.

It is believed that the operation, both of the propellers, and their function, will be sufficiently understood from the foregoing, so that further description is unnecessary.

Of course, the propeller for aircraft, herein illustrated, may be modified in various ways without departing from the invention herein set forth and hereafter claimed.

The invention is hereby described as follows:

1. The combination with an aircraft embodying oppositely extending wings and ailerons carried by said wings, lifter propellers carried by said wings, and means extending from each aileron to an oppositely positioned lifting propeller for retarding the action of said propeller.

2. The combination with an aircraft embodying oppositely extending wings, an aileron carried by each of said wings, a lifter propeller carried by each of said wings and mounted upon a normally vertical shaft, and means connecting each of said ailerons with the shaft upon the opposite wing, tending to retard said shaft when said connected aileron is tilted.

3. The combination of an aircraft embodying oppositely extending wings, a lifting propeller carried by each of said oppositely extending wings, a wind wheel carried by each of said wings positioned to respond to air slip and interconnected to drive the lifter propeller, an aileron carried by each of said wings, and means connecting said ailerons with said lifting propellers to retard the lifting propeller of the wing opposite the manipulated aileron.

In testimony whereof I have signed my name to this specification.

ALEXANDER ALTIERI.